(12) United States Patent
Hatch

(10) Patent No.: US 8,504,600 B2
(45) Date of Patent: Aug. 6, 2013

(54) MATHEMATICAL EXPRESSION ENTRY

(75) Inventor: Jeff Hatch, Wilmington, CA (US)

(73) Assignee: I.Q. Joe, LLC, Rancho Palos Verdes (*) Notice: Subject to any disclaimer, the term of this patent is extended or adjusted under 35 U.S.C. 154(b) by 1164 days.

(21) Appl. No.: 12/363,590

(22) Filed: Jan. 30, 2009

(65) Prior Publication Data

US 2010/0194759 A1 Aug. 5, 2010

Related U.S. Application Data

(60) Provisional application No. 61/025,479, filed on Feb. 1, 2008.

(51) Int. Cl.
*G06F 3/00* (2006.01)

(52) U.S. Cl.
USPC .......................................... 708/170

(58) Field of Classification Search
USPC ................................ 708/160–171
See application file for complete search history.

(56) References Cited

U.S. PATENT DOCUMENTS

| | | | |
|---|---|---|---|
| 4,481,598 A | | 11/1984 | Ishiwata |
| 4,545,022 A | * | 10/1985 | Hughins .................. 708/137 |
| 5,025,403 A | * | 6/1991 | Stephens .................. 708/137 |
| 6,854,001 B2 | | 2/2005 | Good et al. |
| 2005/0179665 A1 | | 8/2005 | Kuo |

OTHER PUBLICATIONS

FX-570es User's Guide, Casio, Dec. 31, 2009, http://support.casio.com/pdf/004/fx057ES_Eng.pdf, in 75 pages, See pp. E-8, E-21, E-22.

PCT International Search Report, App. No. PCT/US2009/032448, Date: Jun. 22, 2009, in 3 pages.

* cited by examiner

*Primary Examiner* — Tan V. Mai
(74) *Attorney, Agent, or Firm* — Knobbe, Martens, Olson & Bear LLP

(57) ABSTRACT

Aspects of the present disclosure include a user interface system for allowing a user to quickly and easily change modes of entry and display of mathematical expressions on a math program. The user interface is configured to switch between modes based on a user's entries in order to reflect the user's desired entry format. The user interface contains additional shortcuts and display features which enable a user to enter mathematical expressions quickly and easily, with less confusion.

3 Claims, 11 Drawing Sheets

| | ENTRY | MODE | DISPLAY |
|---|---|---|---|
| 222 | π | Initial | 3.14159 |
| 224 | < | Decreased Precision | 3.1416 |
| 226 | < | Decreased Precision | 3.142 |
| 228 | < | Decreased Precision | 3.14 |
| 230 | > | Increased Precision | 3.142 |
| 232 | > | Increased Precision | 3.1416 |
| 234 | > | Increased Precision | 3.14159 |
| 236 | > | Increased Precision | 3.141592 |

| | ENTRY | MODE | DISPLAY |
|---|---|---|---|
| 242 | π | Initial | 3.14159 |
| 244 | • | Toggle Precision | 3.14 |
| 246 | • | Toggle Precision | 3.141592654 |
| 248 | •,• | Toggle Precision | 3.14 |
| 250 | 1/3 | Default (Maintain Precision) | 0.33 |
| 252 | • | Toggle Precision | 0.333333333 |

| | ENTRY | MODE | DISPLAY |
|---|---|---|---|
| 222 → | π | Initial | 3.14159 |
| 224 → | < | Decreased Precision | 3.1416 |
| 226 → | < | Decreased Precision | 3.142 |
| 228 → | < | Decreased Precision | 3.14 |
| 230 → | > | Increased Precision | 3.142 |
| 232 → | > | Increased Precision | 3.1416 |
| 234 → | > | Increased Precision | 3.14159 |
| 236 → | > | Increased Precision | 3.141592 |

FIG. 2A

| ENTRY | MODE | DISPLAY |
|---|---|---|
| 242 → π | Initial | 3.14159 |
| 244 → • | Toggle Precision | 3.14 |
| 246 → • | Toggle Precision | 3.141592654 |
| 248 → •,• | Toggle Precision | 3.14 |
| 250 → 1/3 | Default (Maintain Precision) | 0.33 |
| 252 → • | Toggle Precision | 0.333333333 |

FIG. 2B

| ENTRY | MODE | DISPLAY |
|---|---|---|
| 262 → 1/4 | Initial | 0.25 |
| 264 → / | Toggle Display | 1/4 |
| 266 → • | Toggle Display | 0.25 |

*FIG. 2C*

| ENTRY | MODE | DISPLAY |
|---|---|---|
| 272 → 1/4 | Initial | 0.25 |
| 274 → / | Toggle Display | $\frac{1}{4}$ |
| 276 → $2^{ND}$/ | Toggle Display | 25% |
| 278 → • | Toggle Display | 0.25 |
| 280 → $2^{ND}$/ | Toggle Display | 25% |

FIG. 2D

| | ENTRY | MODE | DISPLAY |
|---|---|---|---|
| 292 → | 10000 | Initial | 10,000 |
| 294 → | ^ | Toggle Display | $1 \times 10^4$ |
| 296 → | ^ | Toggle Display | 1E4 |
| 298 → | ^ | Toggle Display | 10,000 |

FIG. 2E

| | ENTRY | MODE | DISPLAY |
|---|---|---|---|
| 302 → | 1/3 | Initial | 0.3333 |
| 304 → | / | Toggle Display (Proper Fraction) | $\frac{1}{3}$ |
| 306 → | +2 | Mixed Number | $2\frac{1}{3}$ |
| 308 → | / | Improper Fraction | $\frac{7}{3}$ |

FIG. 3

| ENTRY | MODE | DISPLAY |
|---|---|---|
| 402 → 6.0221415 E 23 | Initial | 6.0221415 E 23 |
| 404 → ^ | Toggle Display | 6.0221415 × 10$^{23}$ |
| 406 → • | Toggle Display | 6.022 × 10$^{23}$ |
| 408 → > | Increased Precision | 6.0221 × 10$^{23}$ |
| 410 → > | Increased Precision | 6.02214 × 10$^{23}$ |
| 412 → ^,^ | Toggle Display | 6.02214 E 23 |

FIG. 4

MATHEMATICAL EXPRESSION ENTRY

PRIORITY CLAIM

The present application claims priority benefit under 35 U.S.C. §119(e) from U.S. Provisional Application No. 61/025,479, filed Feb. 1, 2008, entitled MATHEMATICAL EXPRESSIONS ENTRY, which is incorporated by reference herein.

FIELD OF THE DISCLOSURE

The present disclosure relates to the field of mathematical expression entry systems for use on computing platforms.

BACKGROUND

Electronic devices, such as computers and calculators have become very useful tools for analyzing mathematical expressions. Increasingly, students in schools use calculators to aid them in learning math. The graphing calculator in particular has become a very popular tool for students. Graphing calculators are generally capable of solving complex mathematical expressions, graphing and comparing functions, plotting and analyzing data, computing financial and statistical equations, and running additional software.

SUMMARY OF THE DISCLOSURE

However, graphing calculators, like math programs running on personal computers (PC's), are generally overly complicated to use and often are unable to format a mathematical expression to be similar on the calculator or computer as it is in longhand. Aspects of the present disclosure include a simple user interface system for allowing a user to display mathematical expressions on a math program formatted longhand style. In addition, the present disclosure discloses a system for quickly changing the display and/or entry preferences of a user based on the user's entry and the current state of the calculation program.

Graphing calculators in particular typically have complex sets of menus and settings to change display and/or entry preferences. The menu structure helps reduce cost and decrease button clutter by reducing the number of buttons on the calculator. Aspects of the present disclosure include adding to the functionality of existing buttons on a calculator based on the context of a button press to allow for changes in display and/or entry preferences, thereby reducing cost, decreasing button clutter, simplifying the entry process, and making the entry process more intuitive.

A setting generally buried in a menu setting, for example, is the numerical precision of the calculator. A user typically must first determine where in the menu structure the setting is located and then which specific setting implements the desired preference. Similarly, changing between decimal and percentage display modes also typically requires changing a difficult to find setting, if the feature exists at all.

Additional aspects of the disclosure include changing numerical displays from a decimal to a more intuitive display of fractions resembling longhand notation. The changing display for fractions can also aid in the entry or editing of algebraic expressions, including algebraic expressions that involve fractions.

In an embodiment, the determination of which functionality of a particular key is to be used is based on the context of the key actuation. This is because certain keys are not generally used in certain contexts. Thus, in these unused contexts, the functionality of the keys can be added to or changed to provide functionality which is useful in the generally unused contexts.

There are many different types of contexts during which a key can be actuated. The context can include, such as, for example, whether the user is at the start of the expression entry process, in the process of entering an expression or at a display of a requested calculation (e.g. the displayed answer). Other contexts will be apparent to those of skill in the art from the present disclosure.

Certain keys are not generally useful at the beginning of an expression or after receiving a requested calculation. For example, in one embodiment, the left arrow key is generally used to move the cursor left in an entered expression so as to edit a particular section of the expression. However, the left arrow key generally serves no purpose if actuated at the very start of an expression entry. The present disclosure recognizes this issue and assigns additional functionality to the left arrow key where the normal use of the left arrow key provides no other significant function.

In an embodiment, the left arrow key is provided with the additional functionality of changing the precision of the expression to be entered, or, if a requested calculation has been received it changes the precision of the calculation when the left arrow key is actuated at the very beginning of an expression or after a calculation is received. Similarly, the present disclosure recognizes a number of other keys which, similar to the left arrow key, are not generally used during certain contexts and can therefore be assigned additional functionalities in those contexts.

In particular, providing additional functionality to otherwise under-utilized existing keys alleviates the need to add additional keys which may serve to only further confuse the user and make it more difficult for the user to find the particular key they are searching for. Thus, the present disclosure provides an interface which significantly adds to the functionality of existing keys without requiring additional keys to be added.

BRIEF DESCRIPTION OF THE DRAWINGS

FIG. 2A illustrates a sample user entry character stream for increasing and decreasing the precision of a displayed number.

FIG. 2B illustrates a sample user entry character stream for toggling the precision of a displayed number.

FIG. 2C illustrates a sample user entry character stream for changing between decimal and fractional display modes.

FIG. 2D illustrates a sample user entry character stream for changing between decimal, fractional, and percentage display modes.

FIG. 2E illustrates a sample user entry character stream for changing between standard and scientific notation display modes.

FIG. 3 illustrates a sample user entry character stream for changing between decimal and various fractional display modes.

FIG. 4 illustrates a sample user entry character stream for changing precision and display modes.

DETAILED DESCRIPTION

A graphing calculator has a relatively small number of keys, as a result, certain functions must be accessed by pressing multiple keystroke combinations or entering menus to change settings or display modes. For example, on some graphing calculators, changing between displaying standard and scientific notation requires entering into a menu to change the display mode to scientific notation. When the user no longer wishes to display scientific notation, he or she typically must return to the menu settings to again change the mode. Similarly, tasks such as changing the precision of the displayed number require changing settings, often buried within a complex menu structure. In an embodiment, the number of keystrokes to change modes is reduced. In an embodiment, the settings change does not require entering settings within a menu structure. It is to be understood that any "key" referred to herein (such as the square root key) may be only a single keystroke on certain platforms, and may be a combination of two keystrokes on certain other platforms.

Figure 1A:
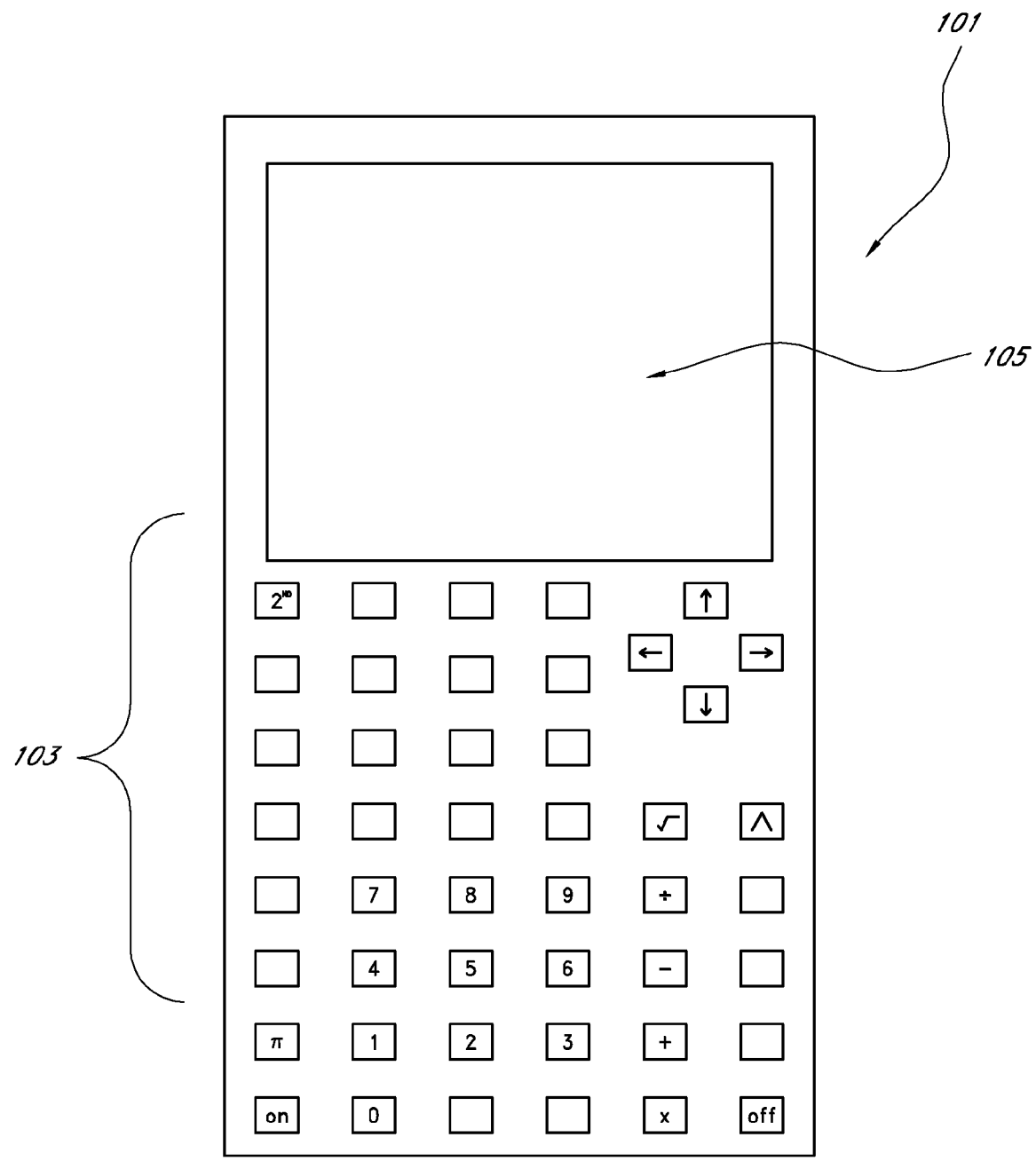
FIG. 1A illustrates a simplified typical graphing calculator.

FIG. 1A illustrates a graphing calculator 101. The graphing calculator 101 has keys 103 and a display screen 105. There are many different types of graphing calculators generally available for sale, each with its own unique key scheme and functionality. For example, graphing calculators manufactured and sold by Texas Instruments, Casio, Hewlett-Packard, and other manufacturers are readily available for sale. In addition, various expression entry and solving programs for personal computers are also readily available. For example, software programs for math expression entry and solving are available from Softmath, Bagatrix, Inc., Maplesoft, Design Science, Microsoft and other manufacturers. It is to be understood by a person of skill in the art that the present disclosure is not limited to a particular graphing calculator or computing platform, rather, the present disclosure can be used on any mathematical expression entering or solving platform including calculators, graphing calculators, personal computers, mobile phones, PDA's, or the like for use with any program editing software.

In general, aspects of the present disclosure can be implemented in both hardware and software. In an embodiment, aspects of the present disclosure are implanted in software and downloaded onto the user's platform. For example, the software can be downloaded from a network connection, such as the internet, or from a compact disc or other storage medium. Once on the platform, the software can be integrated into the existing platform, or form a separate platform.

In an embodiment, mathematical expression entry interface software, also referred to herein as "the interface," facilitates changing multiple display modes enabling the interface to increase the functionality of keys to provide a more intuitive user interface. In general, the selection of keys for display mode changes requires some care. For example, adding mode change functionality to a key that is likely to be used at the start of a new entry can lead to unexpected results from the user's point of view. These keys include, such as, for example, digits, letters, the negative sign key, and common mathematical functions such as sin, cos, tan, log, etc. Keys which are less likely to be used at the beginning of a new entry include such as, for example, the directional arrows, divide, multiply, decimal, caret, or other similar keys. In an embodiment, the selected key for mode change is not a key likely to be used at the beginning of a new entry.

Figure 1B:
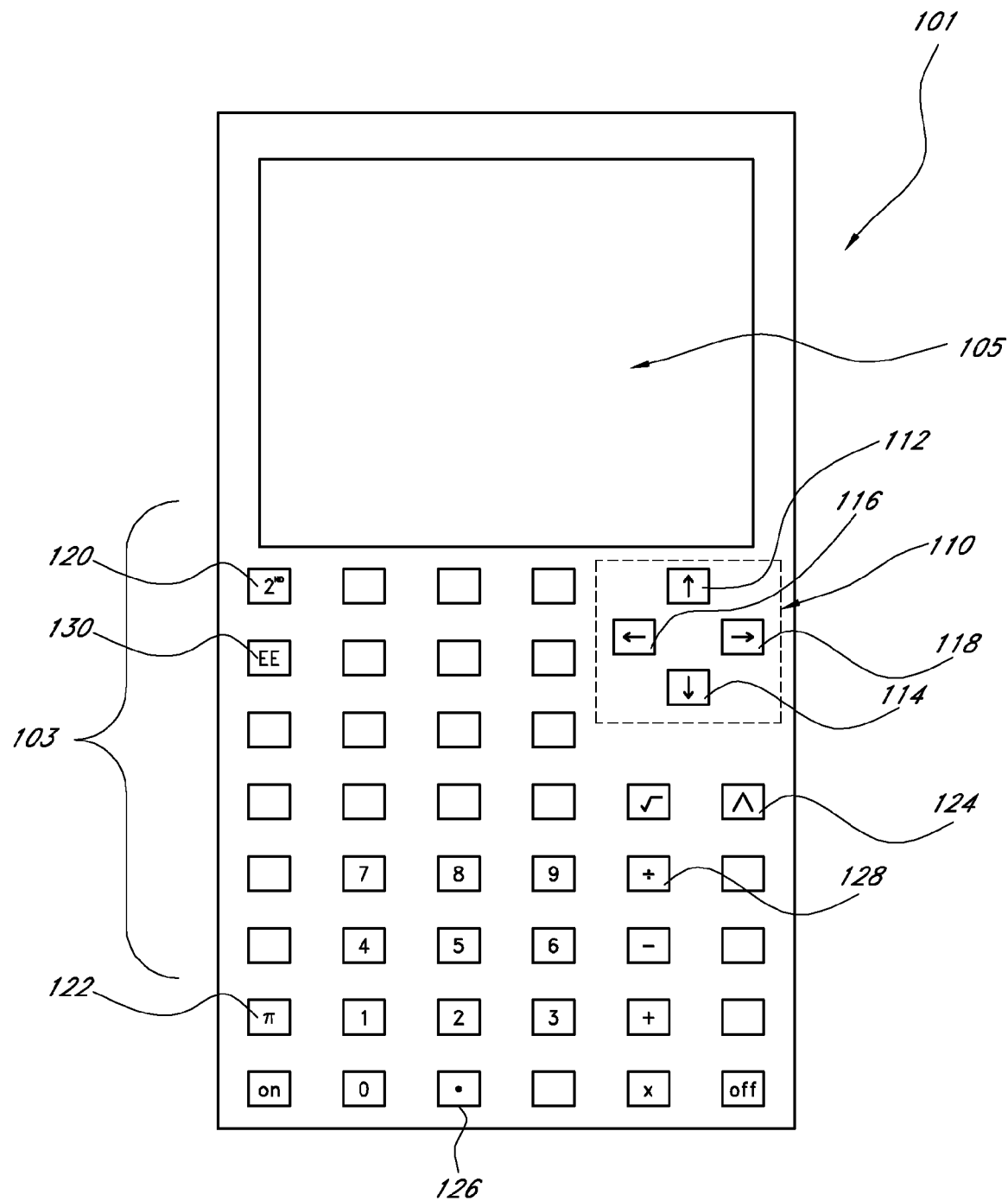
FIG. 1B illustrates a simplified subset of keys on a typical graphing calculator.

FIG. 1B illustrates a simplified subset of keys for a typical graphing calculator. The following descriptions describe typical functionality for the keys. However, the functionality can differ on some calculators or using some computational software programs. As depicted in FIG. 1B, the keys include a set of directional arrows 110. The directional arrows 110 include an up arrow 112, down arrow 114, left arrow 116, and right arrow 118. A $2^{ND}$ key 120 allows for the overloading of functionality on other keys. The $\pi$ key 122, allows for easy entry of the constant, pi. The caret key 124, generally allows for the entry of powers, such as, for example, squares and cubes. The decimal key 126 allows for the entry of a decimal point. Finally, pressing the divide key 128, generally allows for mathematical divide operation.

When the interface is installed, however, the typical functionality for these keys can be added to with additional functionality that simplifies a user's ability to enter expressions or change the way entered expressions are displayed using the interface without adding keys and without requiring the use of a complicated series of key actuations. The interface determines the context during which a user's key actuation occurs and reacts accordingly. For example, the interface can make determinations based upon the type of expression that a user enters or the calculation state of the interface. In an embodiment, an algebraic entry with variables can be treated differently than simple arithmetic entry. Similarly, in an embodiment, key actuations which occur during an expression entry can provide different functionality then when key actuations occur after a calculation is performed and/or before the beginning of the next entry. For example, after an expression is entered and a calculation performed, such as, for example, by depressing the "ENTER" key, entry keys previously used to edit an expression are now provided the functionality to change the form of the displayed answer. In an embodiment in which a virtual keyboard is used, the key name on the virtual keyboard can be changed to indicate the changed functionality. In an embodiment, independent of the calculation state of the interface, the user can use a mode key or other dedicated key to change the functionality of existing keys, the different functionality configured to change the way an expression or answer is displayed. In an embodiment in which a virtual keyboard is used, the key name on the virtual keyboard can be changed to indicate the new functionality.

In an embodiment, the left arrow 116 and right arrow keys are provided with additional functionality to allow a user to decrease and increase, respectively, the precision of a displayed number. In an embodiment, the decimal key 126 is provided with additional functionality to allow a user to select a preferred precision for a displayed number. In an embodiment, the selected precision is maintained through subsequent calculations. In an embodiment, the divide key 128 is provided with additional functionality to allow a user to toggle the display and entry of an expression from decimal to fractional. In an embodiment, the divide key 128 is provided with additional functionality to allow a user to toggle the display and entry of an expression between mixed fraction and improper fraction displays. In an embodiment, pressing the $2^{ND}$ key 120 followed by the divide key 128 is provided with additional functionality to allow a user to display and entry of an expression as a percentage. In an embodiment, the caret key is provided with additional functionality to allow a user to toggle the display and entry of an expression from standard and scientific notation. In an embodiment, pressing the caret key is provided with additional functionality to allow a user to toggle the displayed or entered expression from decimal display to scientific notation to standard calculator versions of scientific notation. An example of this embodiment is switching from displaying or entering the number 10,000 to $1 \times 10^4$ to 1 E 4. In an embodiment, the MODE key is provided with the additional functionality of toggling between all possible display options including, such as, for example proper fraction, mixed fraction, improper fraction, percentage, scientific notation, decimal, and so forth.

Figure 1C:
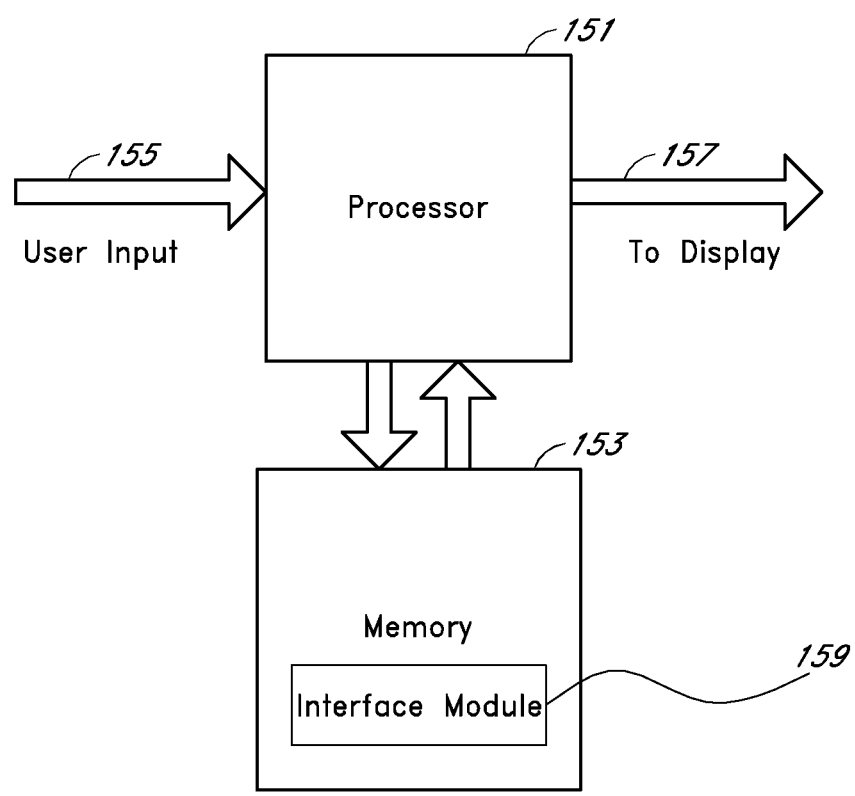
FIG. 1C illustrates a processing system for processing mathematical expressions.

FIG. 1C illustrates an embodiment of the hardware used in a mathematical expression entry processing system. A processor 151 is in communication with memory 153. Memory 153 can be read only, read write, flash, RAM, ROM, or any other type of memory. The processor accepts user inputs, processes the user inputs in communication with the memory. The processor also sends information to the display. As shown in FIG. 1C, the interface module is stored in the memory 153.

Figure 1D:
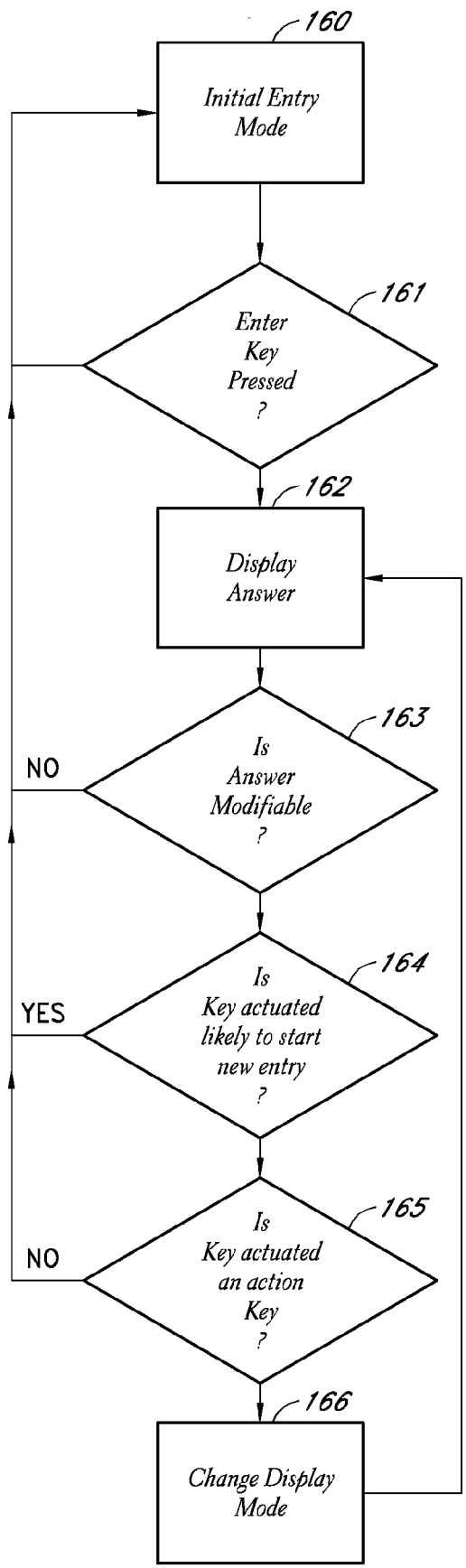
FIG. 1D illustrates a flow chart of an embodiment of a mathematical expression entry system.

FIG. 1D illustrates a flowchart of an embodiment of a mathematical expression entry and display system. The system starts at block 160 in the initial entry mode. In the initial entry mode, the interface operates similar to a traditional graphing calculator. However, if a key is actuated, then the system moves to block 161 where the system determines whether an enter key, "=" key, or the like has been actuated to receive a calculation from the calculator. If an enter key or the like has not been actuated, then the system returns to block 160. If an enter key or the like has been actuated, then the system moves to block 162 where an answer is displayed. Once a key is actuated, the system moves to block 163, where the system determines whether the previous answer is modifiable. For example, some answers are not modifiable, such as, for example, a true or false answer or the like. If the answer is not modifiable, the system returns to block 160. If the answer is modifiable, then the system moves to block 164. A modifiable answer may include, such as, for example, a decimal value, a fraction, or the like. At block 164, the system determines whether the key actuated is likely to start a new entry. If the answer is yes, then the system returns to block 160. If the answer is no, then the system moves to block 165. At block 165, the system determines whether the key actuated is an action key. Action keys can include various keys which can be used to modify the displayed answer or perform another special task as described in the present description. If the key actuated is not an action key, then the system returns to block 160. If the key actuated is an action key, then the system moves to block 166 where the display mode is changed. The system then returns to block 162 where the previously displayed answer is modified in accordance with the current display mode. The process then continues as previously described.

Increasing or Decreasing Precision

In an embodiment, existing keys are used to increase and decrease the precision of a displayed number without entering into a menu. In an embodiment, the interface determines when to change precision based on the state of the display. In an embodiment, the interface changes precision when the display is the result of a previous operation. FIG. 2A illustrates a sample user entry character stream for decreasing and increasing the precision of a displayed number. The entry begins with step 222 where the user enters the constant pi by pressing the π key (FIG. 1B, 122). The graphing calculator, in its initial mode, displays the decimal value 3.14159. In step 224, the user then presses a key, such as, for example, the left arrow key (FIG. 1B, 116) to decrease the precision of the displayed number by one digit. The resulting display reads 3.1415. In an embodiment, the user presses the left arrow key to decrease the precision of the displayed number or expression. In step 226, the user then presses the same key, or combination of keys, to further decrease the precision of the displayed number. The resulting display reads 3.141. In step 228, the user presses the same key, or combination of keys, to decrease the precision of the displayed number yet again. The resulting display reads 3.14.

If the user then wanted to increase the precision of the displayed number, another series of key strokes could be entered. In step 230, the user presses a key or combination of keys, such as, for example, the right arrow key (FIG. 1B, 118) to increase the precision of the displayed number by one digit. The resulting display reads 3.141. In an embodiment, the user presses the right arrow key to increase the precision of the displayed number or expression. In step 232, the user presses the same key, or combination of keys, to further increase the precision of the displayed number. The resulting display reads 3.1415. In step 234, the user presses the same key to again further increase the precision of the displayed number. The resulting display reads 3.14159. In step 236, the user presses the same key to again further increase the precision of the displayed number. The resulting display reads 3.141592. The actual display of the calculator may vary for a given step. For example, rounding may occur with changes in precision. In the foregoing examples, however, the rounding has not been shown for the sake of providing clarity on the increasing and decreasing of precision. In addition, while the foregoing examples have described the change in precision using the left and right arrow keys, other keys can be used for the same functionality. In an embodiment, the user presses the up arrow key to increase the precision of a displayed number or expression. In an embodiment, the user presses the down arrow key to decrease the precision of a displayed number or expression.

More Appropriate Precision

In an embodiment, existing keys are used toggle the precision of a displayed number between a displayed precision and a more appropriate precision. In an embodiment, the interface maintains precision from one calculation to the next. In an embodiment, the interface determines when to change precision based on the state of the display. In an embodiment, the interface changes precision when the display is the result of a previous operation. FIG. 2B illustrates a sample user entry character stream for changing between initial display precision of a displayed number and a more appropriate precision. The more appropriate precision can be, for example, the calculator's maximum precision, a user selected precision, a precision chosen based on the mode of entry, or any other suitable precision.

The expression entry begins with step 242 where the user enters the constant pi by pressing the π key (FIG. 1B, 122). The resulting display reads 3.14159. The user then presses the decimal key (FIG. 1B, 126). This signals to the interface that the user wishes to change precision from the current precision to a more appropriate precision. The interface responds by changing the precision to a more appropriate precision. In an embodiment, the more appropriate precision is user defined or selected. The user defined precision could be, for example, two decimal places. Returning to the example in step 244, the interface would display the more appropriate precision, 3.14.

In an embodiment, the more appropriate precision is the maximum precision of the calculator. In step 246, the user presses the more appropriate precision key and the interface responds by selecting the maximum precision of the calculator. The resulting display reads 3.141592654, for example. As shown by the sequence of entries from step 242, through step 244 and step 246, the more appropriate precision selection can toggle between several appropriate precisions. In an embodiment, the more appropriate precision toggles through initial, user defined, and maximum precisions. Those skilled in the art will recognize from the present disclosure that the toggle order for more appropriate precision can vary.

In step 248, the user presses the more appropriate precision key, until the user's desired appropriate precision appears. Using the previous example where the more appropriate precision key toggles between initial, user defined, and maximum precision, the user presses the more appropriate precision button until the user defined appropriate precision is selected. If the user defined appropriate precision is two decimal places, the display reads 3.14.

Maintain Precision

As previously described, the level of precision can be user selected through various user interactions such as, for example, using, the arrow keys to select a precision or the decimal key to select a more appropriate precision as previously described. In an embodiment, the precision previously selected carries through to the next calculation. The result of FIG. 2B step 248 left the user with a display that reads 3.14 and a selected precision of two decimal places. The user's next entry, step 250, is to perform a new operation, dividing 1 by 3. Maintaining the previously selected precision, the interface causes the calculator to display 3.33. The user, however, can again change the display precision. For example, by pressing the appropriate precision button, the user can toggle to display a more appropriate precision, the maximum precision of the calculator. In step 252, the user presses the more appropriate precision button and the maximum precision of the calculator is displayed, for example 0.333333333. Other appropriate precisions, however, can also be selected by continued pressing of the more appropriate precision button.

Decimal/Fractional/Percentage Display

Users may also want to quickly change between displaying decimal representations of numbers and displaying fractional representations. In an embodiment, the user toggles the display and entry mode from decimal to fractional using the divide key. In an embodiment, the user toggles the display and entry mode from fractional to decimal using the decimal key. In an embodiment, the interface determines when to change fractional or decimal display and entry based on the state of the display. In an embodiment, the interface changes fractional or decimal display or entry modes when the display is the result of a previous operation. FIG. 2C illustrates a sample user entry character stream for toggling between decimal display and fractional display. In step 262, the user enters the operation 1 divided by 4. In an embodiment, the display mode initially displays in decimal mode, with the result displayed as 0.25. In step 264, the user presses an action key, for example, the divide key (FIG. 1B, 128), to toggle the display from decimal to fractional. The result is that the display now shows the fraction $$\frac{1}{4}.$$

In an embodiment, the calculator remains in the previously selected mode. In step 266, the user presses an action key, for example, the decimal key (FIG. 1B, 126), to select the decimal display mode. The result is that the display now shows the decimal representation of the previous calculation, 0.25.

Similarly, users may want to quickly change to another display and entry mode, such as, for example, percentage display. In a percentage display mode, a percentage is displayed and entered as written, such as, for example "25%". In an embodiment, the user selects a keystroke combination to select the percentage display and entry mode. In an embodiment, the interface determines when to change percentage display and entry mode based on the state of the display. In an embodiment, the interface changes to percentage display and entry when the display is the result of a previous operation. FIG. 2D illustrates a sample user entry character stream for toggling between decimal, fractional and percentage display and entry modes. In step 272, the user enters the operation 1 divided by 4. The display mode is initially set to decimal display, with the result displayed as 0.25. In step 274, the user presses the divide key (FIG. 1B, 128) to toggle the display from decimal to fractional. The result is that the display now shows the fraction $$\frac{1}{4}.$$

The user may, however, want to view the result as a percentage.

In an embodiment, the user presses the keystroke combination $2^{ND}$ followed by the divide key to switch the mode to percentage display and entry. Other keystroke combinations can select the percentage display. In step 276, the user presses an action key, such as, for example, $2^{ND}$ key (FIG. 1B, 120) followed by the divide key (FIG. 1B, 128). The result is that the display shows 25%. Using the divide key can be advantageous for selecting both fractional and percentage displays because of the relationship between division, fractions, and percentages and the fact that the divide key often resembles the percentage symbol, %. In an embodiment, the divide key cycles between fractional display, percentage display, and decimal display. Returning to FIG. 2D, the result of step 276 left the display showing 25%. In step 278, the user presses an action key, such as, for example, the decimal key (FIG. 1B, 126), to toggle the display back to the decimal display. The result is that the display shows the decimal equivalent of the number, 0.25. In an embodiment, the user directly toggles from decimal display and entry mode to fractional display and entry mode. In an embodiment, the user directly toggles from fractional display and entry mode to decimal display and entry mode. In step 280, the user presses an action key, such as, for example, the $2^{ND}$ key (FIG. 1B, 120) followed by the divide key (FIG. 1B, 128). The interface interprets this command and toggles between decimal and percentage displays. The result is that the display shows 25%.

Scientific Notation Display

A user may also want to quickly change the display and entry mode from standard decimal to scientific notation. Scientific notation is particularly useful for displaying very large or very small numbers. It breaks numerical representation up into a coefficient, base, and exponent. Written scientific notation, however, follows the form (coefficient)×$10^{(exponent)}$. The number, 10,000, for example, is written as $1\times10^4$. Typically, calculators show scientific notation in some sort of shorthand version. For example, a typical calculator shows the number 10,000 in scientific notation as 1 E 4. The number before the E represents the coefficient. The base for scientific notation is always 10. The E typically represents that base. The number after the E represents the exponent.

In an embodiment, the interface causes the calculator to display scientific notation in the form that it is typically written. A calculator displaying scientific notation in such an embodiment would display the number 10,000, for example, as $1\times10^4$. In an embodiment, the caret key is used to select the scientific notation display mode. In an embodiment, the interface allows the user to select either the typical written form of scientific notation or the typical calculator representation. In an embodiment, the interface determines when to change scientific notation display and entry mode based on the state of the display. In an embodiment, the interface changes scientific notation display and entry mode when the display is the result of a previous operation. FIG. 2E illustrates a sample user entry character stream for such an embodiment. In step 292, the user enters the number 10000. The result is that the display shows 10,000. By pressing an action key, such as, for example, the caret key (FIG. 1B, 124), in step 294, the user toggles the display to the written scientific notation form. The result is that the display shows $1 \times 10^4$. In step 296, the user presses the caret key (FIG. 1B, 124) to toggle from written scientific notation form to the typical calculator display of scientific notation. The result is that the display shows 1 E 4. The user may want to return to standard decimal display. In step 298, the user presses the action key, such as, for example, the caret key (FIG. 1B, 124), to toggle the display to decimal display. The result is that the display shows 10,000.

Proper/Improper/Mixed Fractional Displays

For some users different types of fractional display and entry modes may facilitate calculator operations or understanding. The fractional display modes can include, such as, for example, a mixed fraction and/or improper fraction display mode. In an embodiment, the display mode is defaulted to a decimal display mode. In an embodiment, a user can change the display mode to one or more fractional display modes by actuating a predetermined key, such as, for example, the divide by "/" key. In an embodiment, a user can toggle between fractional display modes by repeated actuation of the divide by "/" key. In an embodiment, the interface display mode remains unchanged from of the display mode of a previous operation.

FIG. 3 illustrates a sample user entry character stream for changing between decimal and at least two fractional display modes—a mixed number display mode and an improper fraction display mode. In step 302, the user enters the operation 1 divided by 3. In the initial decimal display mode with a precision of four digits after the decimal point, the result is that the display reads 0.3333. In step 304, the user enters an action key, such as, for example, the divide by "/" key (FIG. 1B, 128) to change the display mode to one of the fractional display modes, in this case the mixed number display mode. The result is that the calculator displays the proper fraction $$\frac{1}{3}.$$

It is important to note that a proper fraction will be displayed the same for either the mixed number or improper fraction display modes, thus it is not important which fraction display mode is used for proper fractions. At step 306, the user adds 2 to the previous result of step 304. Because the user is in mixed number display mode, the calculator displays the mixed number $$2\frac{1}{3}.$$

Some users, however, may prefer to see the result as an improper fraction. In step 308, the user presses the action key, such as, for example, the divide by "/" key, to toggle the display to show an improper fraction. The result is that the calculator displays the improper fraction $$\frac{7}{3}.$$

If the user again presses the divide by "/" key, the display mode will toggle back to the mixed number display mode and the calculator will once again display the mixed number $$2\frac{1}{3}.$$

Degree/Radian Display

A user may also want to quickly change the display and entry mode from degrees to radians. Measuring angles in degrees is more common and often better understood than measurements in radians. However, radians tend to be a more mathematically acceptable form for displaying angles. Thus a user may wish to switch an answer quickly between degrees and radians, depending on the desired answer format, to help them further understand the differences between degrees and radians, or to confirm that a particular answer makes sense.

In an embodiment, the interface displays angles in either degrees or radians. In an embodiment, the degree symbol is provided with the additional functionality of switching between angles of degree and radians. In an embodiment, the interface determines when the degree symbol should be used to switch between degrees and radians based on the state of the calculation. For example, if the user is actively inputting an expression, the degree symbol can be used to indicate a particular number entered is an angle in degrees. Alternatively, if the degree symbol is actuated after an a calculation is performed and before a new expression entry is begun, the interface can interpret the degree symbol actuation to switch the displayed calculation between angles and radians.

Precise Mathematical Display/Decimal Display

A user may desire to switch between a precise mathematical display and a decimal display. Important mathematical constants may be represented by a specific symbol. For example, pi or π represents the ratio of a circle's circumference to its diameter. However, the decimal equivalent of π is generally a non-exact decimal value (3.14159 . . . ) which can continue almost infinitely. Other mathematical expressions suffer from the same problem in that they do not have an exact decimal value. For example, square roots often represent very long, if not unending, decimal values. Similarly, many fractions also do not have exact decimal values.

In an embodiment, in order to provide a user the ability to easily switch an answer between decimal and precise mathematical values, a predetermined key is provided with the added functionality of switching between a decimal value and a precise mathematical value. In an embodiment, the decimal key "." is used to toggle between a precise mathematical value and a decimal value and vice versa. The added functionality of the decimal key can be used, for example, after a previous answer is obtained and before the next expression entry has begun. In an embodiment, a special key, such as, for example a "MATH" key is used to toggle between a precise mathematical expression and a decimal value. It should be noted that the precise mathematical expression can be, such as, for example, a special constant such as π, a radical, a fraction, or any other mathematical expression that represents the precise mathematical expression as would be understood by those of skill in the art from the present disclosure.

Combination of Embodiments

One of skill in the art will recognize from the present disclosure that the previously disclosed embodiments are not to be read in isolation. A user can perform operations from various embodiments during related sets of operations. FIG. 4 illustrates a character stream combining features from the various precision and scientific notation embodiments. In step 402, the user enters the constant known as Avogadro's number by pressing 6.0221415 E 23. The result is that the calculator displays 6.0221415 E 23. The user, however, may want to show the constant written in scientific notation form. In step 404, the user presses an action key, such as, for example, the caret key (FIG. 1B, 124) to toggle the display mode. The result is that the calculator displays $6.0221415 \times 10^{23}$. The user, however, may want to change the precision of the display to a more appropriate precision. In step 406, the user presses an action key, such as, for example, the decimal key (FIG. 1B, 126) to toggle the precision to the more appropriate (user defined at three digits after the decimal point, for example) precision. The result is that the calculator displays $6.022 \times 10^{23}$. The user, however, may not be satisfied with this level of precision and want to increase it. In step 408, the user presses an action key, such as, for example, the right arrow key (FIG. 1B, 118) to increase the precision of the displayed number by one digit. The result is that the calculator displays $6.0221 \times 10^{23}$. In step 410, the user presses the right arrow key (FIG. 1B, 118) to increase the precision of the displayed number by one digit. The result is that the calculator displays $6.02214 \times 10^{23}$. The user may then want to return to the traditional calculator display for scientific notation. In step 412, the user presses the caret key (FIG. 1B, 124) twice to toggle through decimal display to traditional calculator display for scientific notation. The result is that the calculator displays 6.02214 E 23. Other combinations of disclosed embodiments are also possible.

Mode Key Cycling

In an embodiment based on the above examples, a Mode key or Mode equivalent key is used to cycle between different forms of a displayed result. For example, in an embodiment, a single designated key, such as, for example, a Mode key, when actuated cycles a displayed result between two or more of decimal, fraction, mixed fraction, scientific notation or other notation forms. In an embodiment, the designated key has its normal function when pushed once but begins to cycle through different display forms when the key is actuated two or more times.

Although the foregoing disclosure has been described in terms of certain preferred embodiments, other embodiments will be apparent to those of ordinary skill in the art from the disclosure herein. For example, the use of specific keys to perform functions was meant as a descriptive aid rather than an exhaustive list of key mappings to operations. For example, although the increase and decrease precision embodiments were described using the right arrow (FIG. 1B, 118) and left arrow (FIG. 1B, 116), respectively, other keys such as, for example, the up arrow (FIG. 1B, 112) and down arrow (FIG. 1B, 114) could perform similar functions. The scientific notation embodiments were described using the caret key, (FIG. 1B, 124), other keys such as, for example, the EE key (FIG. 1B, 130) could perform similar functions. The fractional display embodiments were described using the divide key (FIG. 1B, 128) and decimal display embodiments were described using the decimal key (FIG. 1B, 126), however other keys could perform similar functions. The concepts disclosed herein are also applicable to hardware and software platforms that utilize virtual keyboards and virtual keys can be dynamically renamed consistent with the functionality provided to the key during the use of the platform.

Combinations are possible, such as, for example, the process of changing between various display modes, which was described herein with respect to display of fractions, scientific, and decimal notations, could also be applied to the display of other mathematical displays which are customarily displayed with special formatting, such as, for example, powers of 2, polar notation, rectangular notation, trigonometric function display and other suitable mathematical displays. Additionally, other combinations, omissions, substitutions and modifications will be apparent to the skilled artisan in view of the disclosure herein. It is contemplated that various aspects and features of the disclosure described can be practiced separately, combined together, or substituted for one another, and that a variety of combinations and subcombinations of the features and aspects can be made and still fall within the scope of the disclosure. Furthermore, the systems described above need not include all of the modules and functions described in the preferred embodiments. Accordingly, the present disclosure is not intended to be limited by the recitation of the preferred embodiments, but is to be defined by reference to the appended claims.

I claim:

1. A calculation device configured to allow a user to quickly and efficiently change the way an expression is displayed, the calculation device comprising:
   entry keys configured to allow a user to enter various mathematical expressions;
   a display configured to display mathematical expressions; and
   a processor configured to receive entry key inputs in an entry mode and display a mathematical expression representing the entry key inputs on the display, the processor further configured to determine and display a result to the entered expression in a result mode, wherein when the processor is in the result mode, a designated key cycles the displayed result between three or more display formats.

2. The calculation device of claim 1, wherein the designated key is the MODE key.

3. The calculation device of claim 1, wherein the display format comprises one or more of decimal format, fractional format, scientific format, mixed fractional format, and improper fractional format.

* * * * *